A. F. TAYLOR.
GREASE CUP.
APPLICATION FILED NOV. 30, 1906. RENEWED NOV. 14, 1908.
931,659. Patented Aug. 17, 1909.
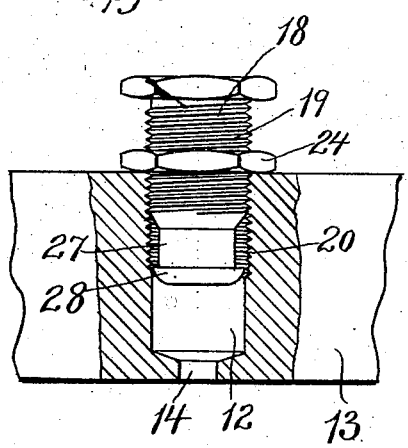
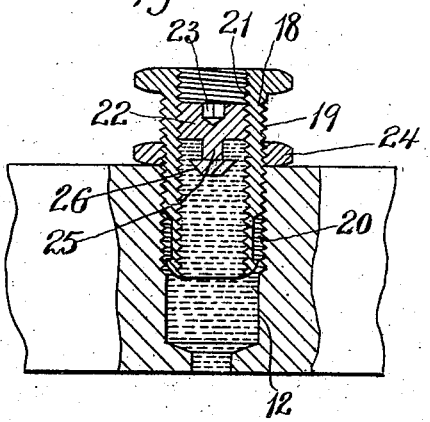
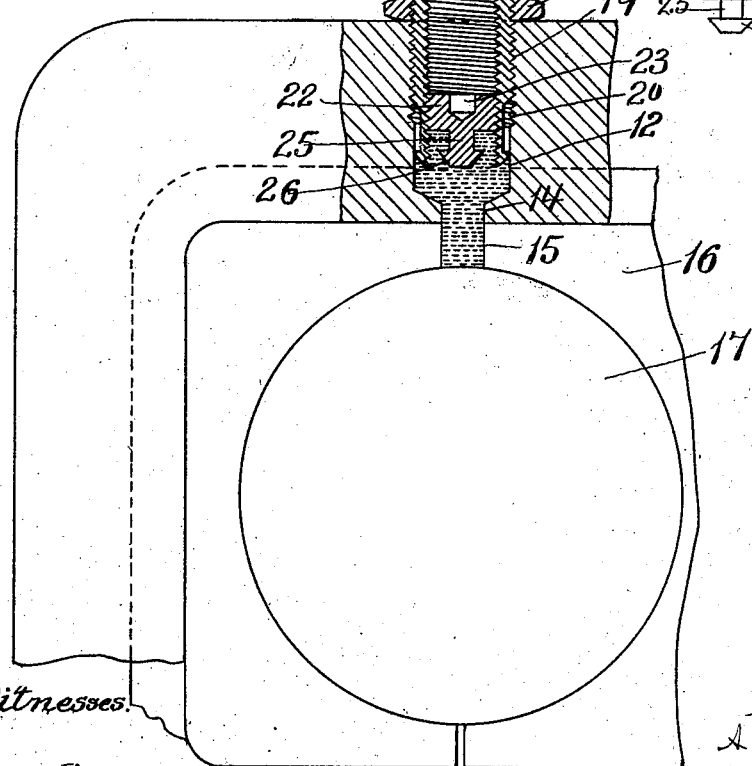
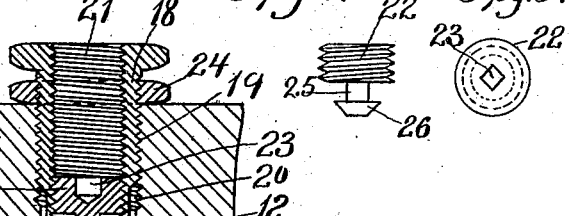

UNITED STATES PATENT OFFICE.

ARTHUR F. TAYLOR, OF HALIFAX, NOVA SCOTIA, CANADA, ASSIGNOR, BY MESNE ASSIGNMENTS, TO ROBIE S. DAVISON, OF HALIFAX, NOVA SCOTIA, CANADA.

GREASE-CUP.

No. 931,659.            Specification of Letters Patent.         Patented Aug. 17, 1909.

Application filed November 30, 1906, Serial No. 345,731. Renewed November 14, 1908. Serial No. 462,618.

*To all whom it may concern.*

Be it known that I, ARTHUR F. TAYLOR, of Halifax, in the county of Halifax and Province of Nova Scotia, Canada, have invented certain new and useful Improvements in Grease-Cups, of which the following is a specification.

This invention relates to grease cups intended particularly for use on locomotive engines to lubricate the crank pin. Grease cups of this character employ a relatively hard grease, the cup being provided with a screw-threaded plug which confines the grease, and is adjustable to force it inwardly toward the crank pin as the supply is reduced by wear. A serious difficulty that has heretofore been experienced with grease cups of this character, is the liability of the loss of the plug or plunger in consequence of the violent motion imparted to the grease cup by the usual movements of the crank pin, the plunger being thus caused to work loose, and be thrown out of the cup. This entails much annoyance, expense and loss of time.

My invention has for its object to provide a grease cup which shall be free from the above-mentioned objection, and is capable of dealing with a larger charge of grease than the cups heretofore used, so that filling of the cup is less frequently required than heretofore.

The invention consists in the improvements which I will now proceed to describe and claim.

Of the accompanying drawings, forming a part of this specification,—Figure 1 represents a side elevation of the adjustable member of my improved grease cup, the member formed in the connecting rod strap being shown in section. Fig. 2 represents a view similar to Fig. 1, showing the adjustable member in section. Fig. 3 represents a view similar to Fig. 2, showing the crank pin and journal box, the adjustable member of the grease cup having a different adjustment from that shown in Fig. 2. Figs. 4 and 5 represent, respectively, a side view and an end view of the plug or plunger in the adjustable member of the cup.

The same numerals of reference indicate the same parts in all the figures.

In the drawings, 12 represents a cup or cavity formed in a connecting rod strap 13, the wall of said cup being internally screw threaded at its outer portion, and contracted at its inner portion, forming an outlet 14, which communicates with a passage 15 extending through the journal box 16 surrounding a crank pin 17. The strap, journal box and crank pin may be of any construction suitable for use on a locomotive engine, or in any other relation where my improved grease cup will be useful. For convenience I will refer to the strap 13 having the chamber 12 as the inner member of the grease cup in order to distinguish it from the tubular member hereinafter described, which is adjustable relatively to the member 12 and which may be referred to as the outer member, the terms inner and outer having reference to the point of supply or feed of the grease.

18 represents the adjustable outer member of my improved grease cup, the same being a tube open from end to end, and provided with an external screw thread 19 adapted to engage the internal screw thread 20 of the inner member 13. The adjustable member 18 is also provided with an internal thread 21 which engages an external thread formed on a plug or plunger 22. The plunger 22 is adapted to be rotated in the adjustable member 18, said plunger being preferably provided with a squared socket 23 adapted to receive a key or wrench which rotates and adjusts the plunger. 24 represents a lock nut engaged with the external thread of the member 18, and adapted to bear against the strap 13 to lock the member 18 in any position to which it may be adjusted. The plunger 22 is provided with an anchor adapted to engage the grease in the cup, and formed so that its engagement with the grease will prevent loose or accidental rotation of the plunger, thus insuring against the outward working and loss of the plunger which has heretofore been a serious difficulty. The anchor is preferably a stud 25 formed on the inner end of the plunger 22, said stud having an enlargement at its outer end with a beveled periphery 26. The enlargement is formed with its smaller end inward, so that the enlargement is adapted to force its way with the minimum resistance into the charge of grease, the grease surrounding the reduced portion of the stud or anchor, and engaging the shoulder formed by the larger end of the enlargement, thus preventing accidental rotation of the plunger in the direction required to move it out- 'wardly. The inner end portion of the adjustable member 18 is preferably reduced somewhat in diameter at 27, and provided with a shoulder 28 which is formed to have a close sliding fit in the inner portion of the chamber 12.

In practice the chamber 12 of the member 13 is filled with grease. The adjustable member 18 is screwed partly into the member 13, and is locked in position by the lock nut 24. The plunger 22 is then inserted and adjusted until it comes to a firm bearing on the grease, its anchor being embedded in the grease. The member 18 is adjusted inwardly from time to time to compensate for the consumption of the grease without adjustment of the plunger 22 relatively to the member 18, the member 18 and the plunger acting together to force the inner portion of the charge of grease through the outlet 14. When the member 18 has been adjusted inwardly until its inner end abuts against the contracted end of the chamber 12, the remaining portion of the charge is forced outwardly by successive adjustments of the plunger 22.

It will be seen from the foregoing that provision is made for the accommodation of a relatively large charge of grease so that frequent renewal of the charge is not necessary. It will also be seen that the anchoring member of the plunger enables the charge of grease to hold the plunger against accidental outward movement and loss.

I claim:

1. A grease cup comprising an inner member having a grease outlet, a tubular outer member having an adjustable connection with the inner member, and movable toward and from the outlet, locking means for securing the tubular member to the inner member in different positions, and a plug or plunger having an adjustable connection with the tubular member, and provided with means for interlocking with the confined grease.

2. A grease cup comprising an inner member having a grease outlet, a tubular outer member having an adjustable connection with the inner member, and movable toward and from the outlet, and a plug or plunger having an adjustable connection with the tubular member, and provided with means for interlocking with the confined grease.

In testimony whereof I have affixed my signature, in presence of two witnesses.

ARTHUR F. TAYLOR.

Witnesses:
 GUY W. REID,
 J. A. KNIGHT.